Sept. 3, 1940.  W. L. MINICK, JR  2,213,822
VEHICLE WHEEL SUSPENSION
Filed Aug. 6, 1938   2 Sheets-Sheet 1
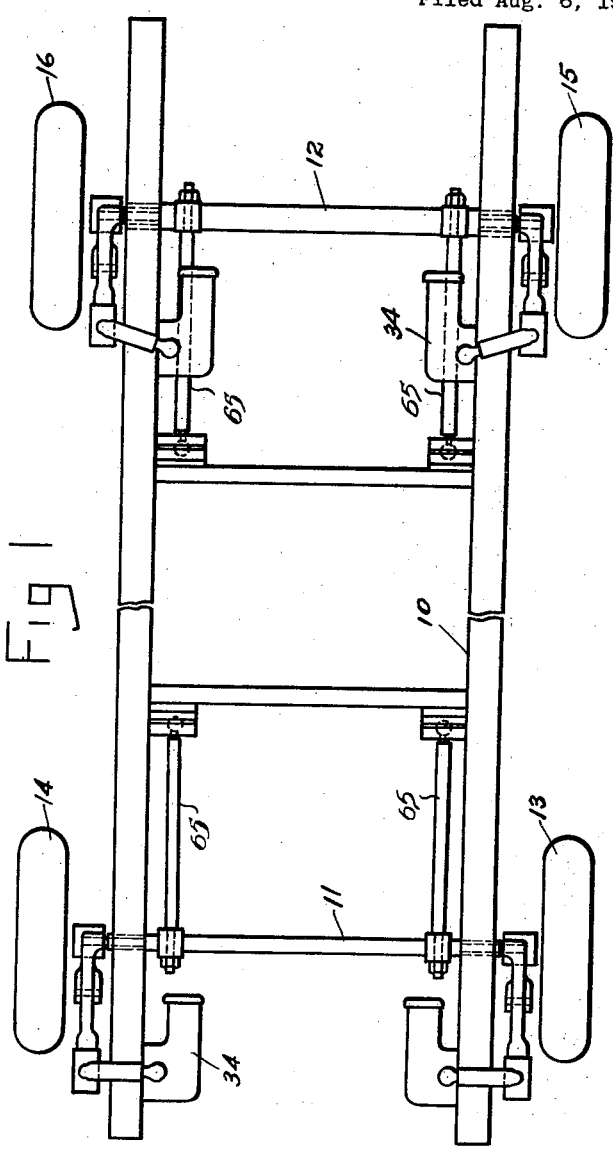
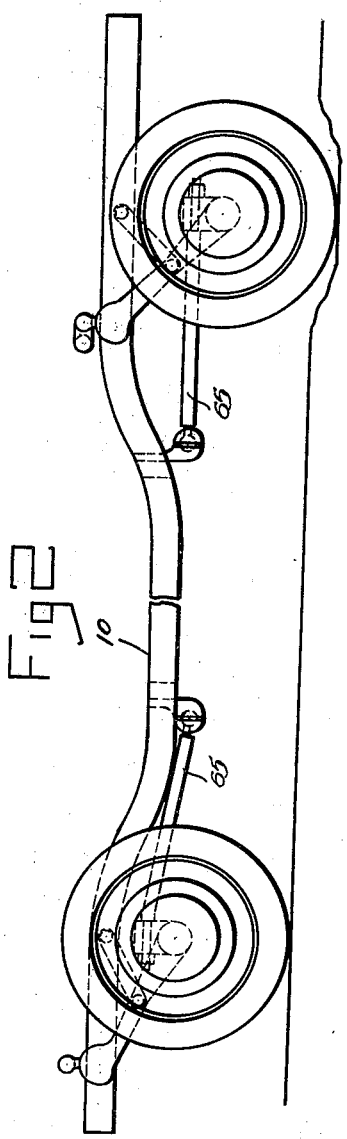
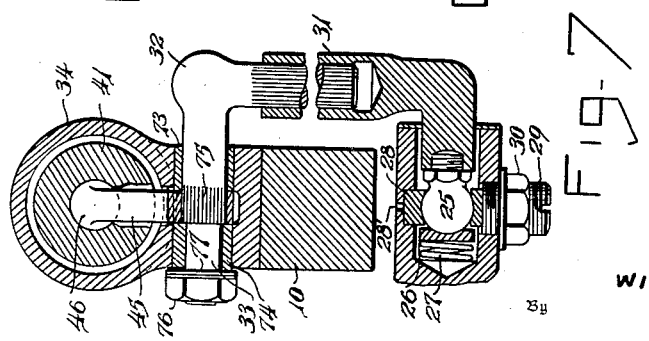
Inventor
WILLIAM L. MINICK JR.
Hugh N Rocks
Attorney Sept. 3, 1940.   W. L. MINICK, JR   2,213,822
VEHICLE WHEEL SUSPENSION
Filed Aug. 6, 1938   2 Sheets-Sheet 2
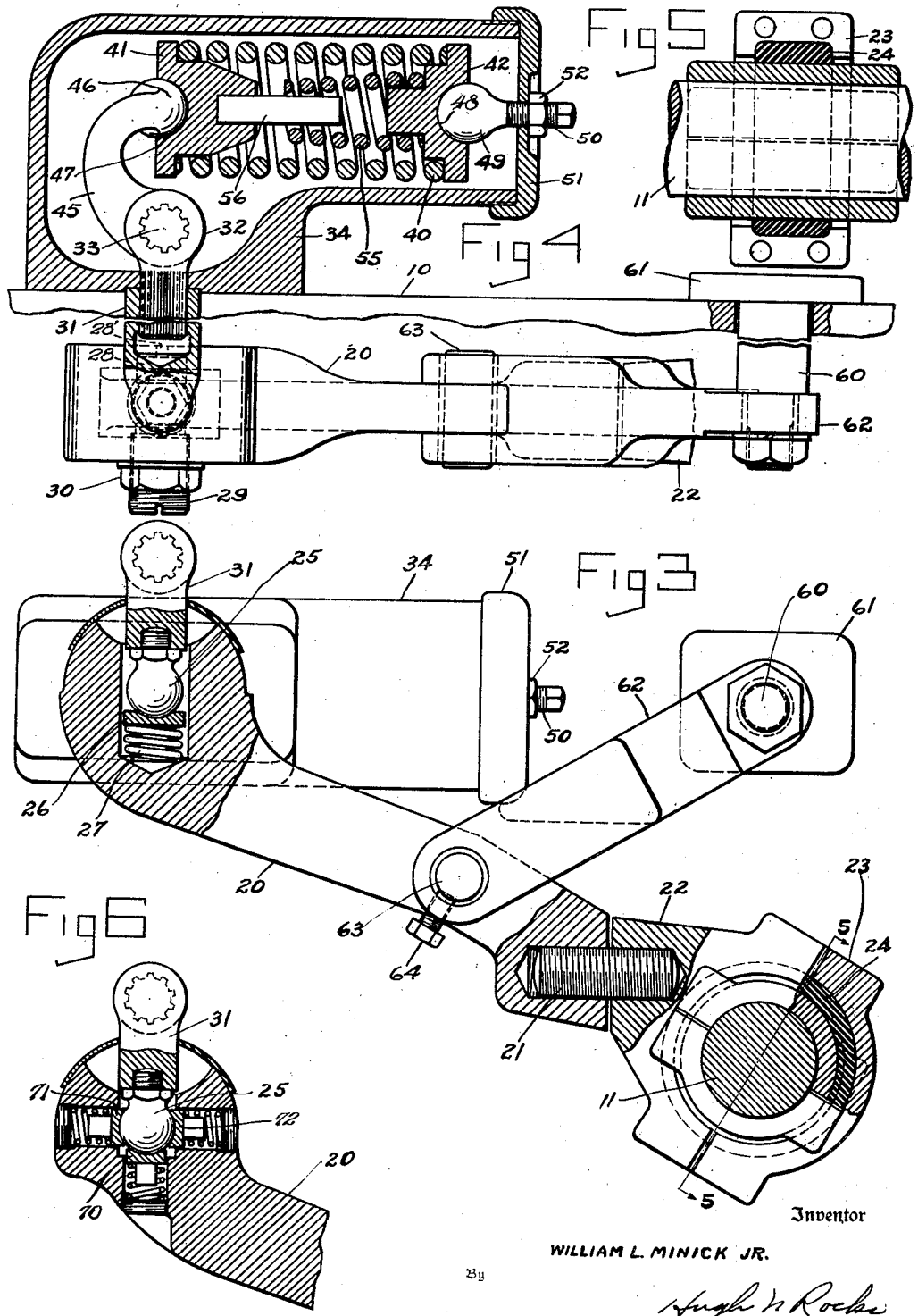
Inventor
WILLIAM L. MINICK JR.
By
Hugh N Rocke
Attorney Patented Sept. 3, 1940

2,213,822

UNITED STATES PATENT OFFICE 2,213,822

VEHICLE WHEEL SUSPENSION

William L. Minick, Jr., Waynesboro, Pa.

Application August 6, 1938, Serial No. 223,386

5 Claims. (Cl. 267—20)

My invention relates to wheel suspensions for automotive or other vehicles and it is an object of same to provide means whereby the vertical position of the body of the vehicle will not change as the wheels pass over irregularities in the road surface.

A further object is to provide a yielding connection between the vehicle frame and the wheel which will offer continuous support to the frame in all positions of the wheel.

A further object is to provide a mechanism having a minimum number of parts.

My invention consists essentially of an arm, one end of which is pivotally attached to the axle of a vehicle, the other end having a ball and socket connection with a telescopic horizontal link. Said link is secured to a stub shaft in a bracket attached to the frame. Said bracket includes a housing in which is mounted a coil spring with its axis in a horizontal position parallel to the frame of the vehicle. A crank arm is secured to said stub shaft and bears against the free end of the coil spring. A direct connection between said frame and the main arm consists of a link, one end of which is pivotally attached to the frame at a point directly above the axle, the other end of which is also pivotally connected to said main arm at a point intermediate the ends thereof.

In the drawings—

Figure 1 is a plan view of an automobile chassis.

Figure 2 is a side elevation.

Figure 3 is a detail side view of the suspension mechanism.

Figure 4 is a plan view of the suspension mechanism.

Figure 5 is a section on the line 5—5 of Figure 3.

Figure 6 is an optional construction of the ball and socket joint of Figure 3.

Figure 7 is a sectional front elevation showing the method of connecting my device to the frame of the vehicle.

In Figures 1 and 2 numeral 10 indicates the frame of an automotive vehicle having a front axle 11 and a rear axle 12. Front wheels 13 and 14 and rear wheels 15 and 16 are attached to the respective axles in any conventional manner. Since the method of mounting the wheels is not a part of this invention, it is not thought necessary to illustrate it here. The means for connecting the axles to the frame consists of an arm 20 and a clamping member. Said arm and said clamping member are connected by means of a stud 21 which permits a relative angular movement between said parts. Said clamping member consists of a base 22 to which said stud is threaded and a cap 23 secured to said base by screws, not shown. Said clamping member is not in direct contact with the axles 11 and 12, a rubber bushing 24 forming the connection therebetween. The end of said arm opposite the axle is bored to receive a ball joint 25 resting on a resiliently supported socket 26. Said ball is supported horizontally by a fixed socket 28 on one side and an adjustable socket 29 on the opposite side. Said fixed socket is pressed into place but may be knocked out for replacement by tapping same with a rod inserted in hole 28'. Said adjustable socket may be locked in position by a lock nut 30. Another form of support for said ball 25 is shown in Figure 6 wherein said ball is supported at the bottom and at the front and rear by adjustable resilient sockets 70, 71 and 72. Said ball is attached to the vertical portion of an angle arm 31. The horizontal end of said arm is hollow and has spline teeth cut therein. Into said arm is inserted another arm 32 having external splines thereon. The splines serve to prevent arm 31 from turning on arm 32. Said arm 32 has a vertical portion supported in bushings 73 and 74 in spring housing 34. Housing 34 is attached to frame 10 in any suitable manner. Said bushings are spaced to permit the entry of arm 45 which is splined to the vertical portion of arm 32 at 75. The lower end of said vertical portion extends beyond housing 34 and is threaded to receive a nut 76 which may be drawn against a shoulder 77 on said vertical portion. Arms 31, 32 and 45 form a lever connecting arm 20 to spring 40. Said housing contains a coil spring 40 held between two end supports 41 and 42. Arm 45 has a spherical end portion 46 which rests in a socket 47 in said spring support 41. The end support 42 also has a socket 48 in which is inserted the spherical end 49 of adjusting screw 50. Said screw is threaded in a cap 51 on housing 34. A lock nut 52 locks said screw 50 in adjusted position. A smaller tapered coil spring 55 is carried at one end by end support 42 and at the other end by a pin 56 inserted in end support 41. Said spring 55 does not engage support 41 until spring 40 has been compressed a predetermined amount. A stud 60 having an enlarged head 61 bolted to frame 10 at a point directly above the axle has a link 62 rotatably mounted thereon. The other end of said link is bifurcated to straddle arm 20 at a point approximately midway between the axle and the ball joint and is pivotally attached thereto by a stub shaft 63.

Said link is secured to said shaft 63 by set screws 64. The axles 11 and 12 are supported horizontally by radius rods 65. One end of each of said rods is secured rigidly to the axle, the other end being attached to the frame by any suitable universal or ball joint.

*Operation*

When a wheel encounters a bump in the road it moves upwardly pivoting both at the ball joint 25 and at the point to which link 62 is attached. Link 62 is thus caused to rotate in a clockwise direction about its bearing on the frame and thereby causes arm 20 to move forward in a horizontal direction. This movement is transmitted thru the lever consisting of angle arm 31, shaft 33 and the curved arm 45 to spring 49. Variation in the distance between ball 25 and shaft 33 is taken care of by the spline construction of arms 31 and 32. If the bump is severe enough to compress spring 49 more than the distance between the tapered spring 55 and its seat on support 42, said tapered spring will provide additional resilience to cushion the shock. Thus instead of the frame being lifted, the vertical movement of the wheel is dissipated in a horizontal direction by means of link 62 and this horizontal movement is cushioned by springs 49 and 55. If only one wheel is affected by the bump, the change in angular relation between the axle and arm will be compensated for thru stud 21 which permits angular movement of clamp base 22 relative to arm 20.

If a wheel drops into a depression, spring 49 thru its above described connection with arm 20 pushes said arm in a horizontal direction which causes link 62 to swing in a counterclockwise direction and convert the horizontal movement into downward vertical movement. Thus, as the wheel drops, the relation between arm and link changes to compensate for the increased distance between the axle and frame and to support said frame until the wheel and axle return to a normal position relative thereto.

I claim:

1. A vehicle wheel suspension including a frame, a wheel and axle assembly, means for supporting said frame on said axle including a spring, an arm, one end of which is pivotally attached to said axle, connections between said arm and said spring including a lever pivoted so that one part thereof engages said spring another part being attached to said arm, said arm consisting of two members joined together so as to permit relative angular movement therebetween about a horizontal axis.

2. A vehicle wheel suspension including a frame, a wheel and axle assembly, connections between said axle and said frame including an arm having one end in the form of a clamp for securing same to said axle, a rubber bushing between said clamp and said axle, the other end of said arm being resiliently attached to said frame, a link joining an intermediate point on said arm with said frame, said link being pivotally attached to both said arm and said frame.

3. In a vehicle, a frame, a wheel and axle assembly, means for supporting said frame on said axle including an arm, one end of which is attached to said axle, a resilient member attached to said frame, and a sliding connection between said arm and said resilient member including a lever one end of which engages said resilient member the other end of which is attached to said arm said other end being formed in two parts one of which engages the other in telescoping relation.

4. In a vehicle of the kind described, a frame, a wheel and axle assembly, means for supporting said frame on said axle including an arm, one end of which is pivotally attached to said axle, a resilient member attached to said frame, a slidable connection between said arm and said resilient member including a lever having one end in contact with said resilient member the other end being connected to said arm and comprising two telescoping portions, a link having one end connected to said frame at a point substantially directly over said axle, the other end being connected to said arm at a point substantially midway between the ends thereof, whereby to convert vertical movement of the wheel into horizontal movement at the frame.

5. A vehicle wheel suspension including a frame, a wheel and axle assembly, means for supporting said frame on said wheel and axle assembly including an arm having one end pivotally attached to said axle, a link joining the mid-point on said arm with said frame, whereby vertical movement of the wheel and axle is converted into horizontal movement at the frame, said link being pivotally attached to said frame, a resilient member on said frame and a lever connecting the other end of said arm to said resilient member.

WILLIAM L. MINICK, Jr.